(12) United States Patent
Hammer et al.

(10) Patent No.: US 8,601,819 B2
(45) Date of Patent: Dec. 10, 2013

(54) METHOD AND DEVICE FOR THE COMBUSTION OF HYDROCARBON-CONTAINING FUELS

(75) Inventors: Thomas Hammer, Hemhofen (DE); Dieter Most, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 896 days.

(21) Appl. No.: 12/451,761

(22) PCT Filed: May 27, 2008

(86) PCT No.: PCT/EP2008/056479
§ 371 (c)(1),
(2), (4) Date: Apr. 28, 2010

(87) PCT Pub. No.: WO2008/145650
PCT Pub. Date: Dec. 4, 2008

(65) Prior Publication Data
US 2011/0126548 A1    Jun. 2, 2011

(30) Foreign Application Priority Data

May 31, 2007   (DE) .......................... 10 2007 025 551

(51) Int. Cl.
*F02C 1/00*   (2006.01)
*F02G 3/00*   (2006.01)

(52) U.S. Cl.
USPC .................. 60/742; 60/737; 60/746; 60/748; 60/740

(58) Field of Classification Search
USPC ........... 60/737, 740, 742, 743, 746, 747, 748, 60/39.821, 39.826, 39.827
See application file for complete search history.

(56) References Cited

U.S. PATENT DOCUMENTS

| | | | |
|---|---|---|---|
| 4,023,351 A * | 5/1977 | Beyler et al. ................. | 60/742 |
| 5,437,250 A * | 8/1995 | Rabinovich et al. ............ | 123/3 |
| 5,598,699 A * | 2/1997 | Few et al. .................. | 60/39.821 |
| 5,640,841 A | 6/1997 | Crosby | |
| 5,689,949 A * | 11/1997 | DeFreitas et al. ............. | 60/776 |
| 5,802,854 A * | 9/1998 | Maeda et al. ................. | 60/737 |
| 7,114,337 B2 * | 10/2006 | Cazalens et al. .............. | 60/737 |
| 8,015,813 B2 * | 9/2011 | Cazalens et al. .............. | 60/737 |
| 2002/0043067 A1 * | 4/2002 | Maeda et al. ................. | 60/776 |
| 2002/0092302 A1 | 7/2002 | Held et al. | |
| 2009/0071158 A1 * | 3/2009 | Cazalens et al. .............. | 60/737 |

FOREIGN PATENT DOCUMENTS

| | | |
|---|---|---|
| DE | 12 54 364 B | 11/1967 |
| DE | 103 45 890 A1 | 4/2005 |
| EP | 1 512 913 A1 | 3/2005 |
| FR | 2 724 806 A1 | 3/1996 |
| WO | WO 03/081130 A1 | 10/2003 |

(Continued)

*Primary Examiner* — William H Rodriguez
(74) *Attorney, Agent, or Firm* — Staas & Halsey LLP (57) ABSTRACT

Electric fields control an electric combustion. Plasmas are created by a dielectrically impeded discharge. At least one part of the fuel is mixed with water vapor in the supply line and is subjected to a plasma discharge in a compact reactor that is in close contact with the burner in terms of reaction kinetics. In the associated device, a plasma reactor for creating a reactive plasma gas with at least one supply line for the fuel gas-water vapor mixture and an electric energy supply is integrated into the burner. The device provides suitable flow guidance of the fuel gas-air mixture, of the fuel gas-water vapor mixture, and of the reactive plasma gas.

33 Claims, 5 Drawing Sheets

(56) References Cited

FOREIGN PATENT DOCUMENTS

| WO | WO 2004/085694 | A2 | 10/2004 |
| WO | WO 2005/017410 | A1 | 2/2005 |
| WO | WO 2005/103568 | A1 | 11/2005 |
| WO | WO 2006/034983 | A1 | 4/2006 |
| WO | WO 2006/067108 | A1 | 6/2006 |

* cited by examiner

METHOD AND DEVICE FOR THE COMBUSTION OF HYDROCARBON-CONTAINING FUELS

CROSS REFERENCE TO RELATED APPLICATIONS

This application is based on and hereby claims priority to PCT Application No. PCT/EP2008/056479 filed on May 27, 2008 and DE Application No. 10 2007 025 551.0 filed on May 31, 2007, the contents of which are hereby incorporated by reference.

BACKGROUND

The invention relates to a method for the combustion of hydrocarbon-containing fuels, in particular of fuel gases. In addition, the invention also relates to the associated device.

For reasons of availability and efficiency, the operation of gas turbine burners increasingly demands the firing of fuels of different quality, which, in the most unfavorable case, may be reflected in differences in calorific value, but, even if the calorific value remains the same, leads to differences in the laminar and the turbulent flame velocity, in the induction time and in the reaction rate. The specific design of a combustion chamber and of a burner head for such burners therefore allows optimal operation with high efficiency and low emissions in each case only for an exactly specified fuel. Similarly, the load range in which a burner can be operated in a stable way and with low emission is largely defined by the respective design.

The use of electrical fields in combustion processes is known, for example, from WO 2006/067108 A1. It is proposed here to control a burner by the application of electrical fields and thereby to improve flexibility in terms of the load range and fuel quality. However, the use of electrical fields, which are not sufficient for igniting and maintaining an electrical gas discharge plasma, allows only a restricted control of combustion which is based on the utilization of the ions generated in the flame itself.

The use of plasmas for inducing pyrolysis and partial oxidation is known from WO 2006/034983 A1. In this case, it is proposed to stabilize combustion by plasmas which are generated by high-frequency excitation in the combustion space. The generation of plasmas in the combustion space of a burner by an electrode arranged in the combustion space is proposed in WO 2003/081130 A1. EP 1 512 913 A1 describes the treatment of fuel/air mixtures in the supply to the burner by cold plasmas for the control of combustion. U.S. Pat. No. 5,640,841 A describes the ignition of a turbine burner by what is known as a plasma torch which can be operated as a pilot not only for the ignition, but also for the stabilization of combustion. WO 2005/017410 A1 proposes to activate the fuel during supply to the burner by dielectrically impeded discharge and thus to improve combustion, for example, in the burners of aircraft engines. For the same purpose, WO 2004/085694 A2 describes the improvement of combustion by the treatment of a gas stream by dielectrically impeded discharges, this gas stream containing either fuel or a mixture of fuel and of an oxidant, for example air, which can be used for the combustion.

In the event that the gas discharge plasma is generated in the combustion space, the methods already known from the related art have the critical disadvantage that, in this case, harmful by-products are formed to an increased extent, such as may occur in smaller quantities even during combustion. Examples of this are, in particular, the formation of nitrogen oxides and carbon monoxide in the case of lean combustion and also the formation of soot and ammonia in the case of rich combustion. If the gas discharge plasma is operated in the fuel supply, in which there is no oxygen present, a product of this pretreatment is soot which often cannot be converted completely during combustion and is therefore also released as a harmful emission.

When the plasma is used in already mixed fuel/air mixtures, so as not to induce combustion already in the supply line to the combustion space, the fuel has to be highly overdosed, as compared with stoichiometric combustion. However, then, the products of plasma treatment, in addition to the hydrogen which promotes combustion, are still carbon monoxide, soot and ammonia. In the same way as soot, carbon monoxide is converted only slowly during combustion and may consequently increase the pollutant emission of the burner if the dwell time in the burner is insufficient. By contrast, alternatively, ammonia, in the case of lean combustion, is converted into nitrogen oxide or, in the case of rich combustion, is not oxidized or is oxidized only partially into laughing gas ($N_2O$) and consequently likewise contributes to the emission of pollutants or greenhouse gases.

The use of plasmas for inducing steam reforming is known. FR 2 724 806 A1 discloses the steam reforming of hydrocarbons and volatile organic substances, which is induced by a gliding arc plasma which avoids some of the problems described: with suitable management, steam reforming can avoid the formation of soot, on the one hand, and the formation of nitrogen oxides, on the other hand.

Disadvantages of the abovementioned methods and devices for steam reforming by plasmas for use in combustion control are that a large reactor volume is required for the reaction of the radicals, that is to say chemically active molecules or atoms, and ions which a plasma of sufficiently high power density provides. Furthermore, plasmas of high power density have been achieved in gases at pressures of one atmosphere and above hitherto only by gas discharges which are in direct electrode contact, so that electrode-guided gas discharges are obtained.

An erosion of the electrodes by the arc which is then unavoidably formed is reduced by measures which force a rapid movement of the arc plasma, including its foot points, on the electrodes. Usually, this is achieved by a rapid gas flow, as described in FR 2 724 806 A1. However, should the gas flow be insufficient, the power fed locally into the electrodes may become very high, thus entailing the explosive fusion and evaporation of large quantities of the electrode material. Furthermore, there is no indication of how steam reforming can be coupled efficiently to combustion processes.

SUMMARY

One potential object is therefore to specify an improved method for plasma-controlled combustion for gas turbines and to provide an associated device.

The inventors propose a method and associated devices, by which the combustion of hydrocarbon-containing fuels can be stabilized, without the problems outlined above arising.

For the stabilization of combustion, the inventors propose that at least part of the fuel is mixed in the supply line to a burner in a controlled way with steam and is subjected to treatment by an electrical gas discharge plasma of controlled high power density (plasma treatment in brief) in a compact reactor which is kinetically in close contact with the combustion reaction. In this context, in close contact means reaction kinetics such that the gas excited and heated as a result of interaction with the plasma is not in thermodynamic equilibrium.

In such a procedure, chemical reactions are triggered which generate stable and temporary products in the fuel/steam mixture. By being admixed directly to the fuel gas or mixture of fuel gas and oxidant which is supplied to the burner, the stable and temporary products of the plasma exhaust gas can be utilized for improved fuel conversion. As a result, the efficiency of the burner is increased, the stability of combustion is ensured over a wider load range than in the related art, and the pollutant emissions from combustion are reduced.

Controlled mixing with steam is understood to mean that a regulation of the mass flow of steam in relation to the mass flow and carbon content of the fuel is carried out. In this case, the specific energy supplied to the mixture by the plasma, that is to say the energy per quantity of the fuel/steam mixture, may be a controlled variable on which the set mass flow of steam depends. A lower limit value for the mass flow of the steam is fixed in that soot formation possible even during steam reforming is avoided, while an upper limit value is set in order to limit the interaction of the plasma with steam to a degree which ensures an efficient conversion of the fuel.

Controlled high electrical power density is understood to mean that the electrical power supplied to the plasma is regulated as a function of mass flows such that, on the one hand, chemically active radicals and ions which initiate the reforming reactions are generated in a high number density and, on the other hand, gas heating takes place which ensures that the chain reactions initiated by radicals and ions do not come to a standstill (chain termination), but, instead, continue in an accelerated way (chain propagation). At the same time, for reasons of energy efficiency and the useful life of the reactor, the electrical power density is to be kept so low as to avoid the formation of what is known as a thermal plasma in which temperatures of typically 5000 K to 20 000 K would occur.

Reaction-kinetically close contact with a burner is understood to mean that the gas excited and heated as a result of interaction with the plasma has no time, on its way to the flame zone of the burner, to reach a thermodynamic equilibrium. This gives rise to a more favorable utilization of the electrical power supplied to the plasma, because, due to the then still present radicals and reactive intermediate products, the combustion induction zone, as it is known (this is understood to mean the zone in which, on account of chain reactions, the temperature and radical density grow slowly before reaction in what is known as the flame front then takes place abruptly) can be shortened to a markedly greater extent than when the thermodynamically stable final state of steam reforming with high hydrogen concentrations is reached before the reformate enters the flame region.

The plasma of high electrical power density can be generated by electrode-guided gas discharges, in which, to avoid the transition to a thermal arc, a regulation of the operating voltage by the plasma impedance takes place. However, electrical gas discharges which are not in contact with electrodes are preferred.

To achieve high power densities, there is provision for exciting the plasmas by high frequencies which lie in the radio frequency range or above, that is to say in the microwave range, that is to say typically from 6.5 MHz into the GHz range. Infeed may take place either capacitively or inductively or in the microwave range by antenna structures for electromagnetic waves.

For compact set-up, the capacitive infeed is particularly advantageous, which can be achieved, for example, in that an electrode generating an electrical field is covered with a thin ceramic layer. The formation of a thermal arc is thereby avoided in a similar way to a dielectrically impeded discharge. At the same time, if a sufficiently high frequency is chosen, the formation of a plasma with high current density and therefore also a high power density is made possible, without in this case high electrical field strengths occurring in the ceramic layer or even, in general, in the dielectric barrier which could lead to their destruction.

In a particularly advantageous refinement, all the electrode structures generating the electrical field are covered with a dielectric barrier. The thickness of the dielectric barrier is in this case to be selected as thin as possible, limits being set, on the one hand, by production-related methods and, on the other hand, by the dielectric strength of the material. This is the electrical field strength, up to which no dielectric breakdown occurs, and, furthermore, the potential drops at the barrier which are possible during operation. A reliable production of such thin layers may take place by conventional processes for generating ceramic structures, but also, for example, by plasma spraying or deposition from the vapor phase generated as a result of plasma evaporation.

The regulation of the power density takes place by a variation of the frequency, a variation of the amplitude or clocking with a variation of the pulse spacing ratio. The exact configuration of the plasma reactor can be adapted to the respective conditions of the burner and of the fuel to be converted. Conversion variants are illustrated by way of example below.

Advantageously, the specified method may also be employed in the presence of synthesis gas-containing fuels ($CO$, $CO_2$, $H_2$ mixtures). Likewise, oxygen can be added to the steam in small quantities, in order to lower the energy requirement of reforming by exothermal reactions of the oxygen with the fuel.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Reference will now be made in detail to the preferred embodiments of the present invention, examples of which are illustrated in the accompanying drawings, wherein like reference numerals refer to like elements throughout.

The figures, in particular FIGS. 1 and 2, on the one hand, and FIGS. 3 and 4, on the other hand, are described below partially in common. In this case, the same or corresponding reference symbols are used for identical or identically acting parts.

In all the burners described below, in each case reference symbol 1 illustrates a ground electrode, 2 a high-voltage (HV) electrode and 3 an insulator. In this case, the HV electrode 2 is in each case arranged centrically in the set-up and is surrounded by the insulator 3, the ground electrode 1 being arranged outside the insulator 3. In each case gas routing ducts 6 and 7 and, if appropriate, a swirl generator 4 are present. A fuel-gas/steam mixture is routed in the inner line 6 and a fuel-gas/air mixture is routed in the outer line 7. A plasma reactor 5 is thus integrated into the burner.

Figure 1:
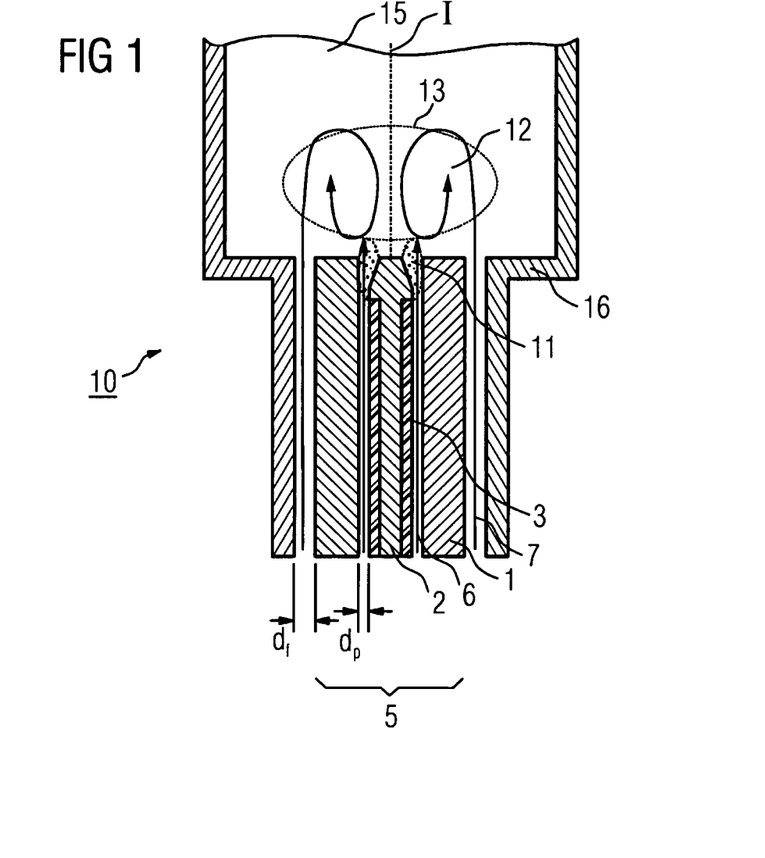
FIG. 1 shows the cross section through a packing burner with gliding arc plasma stabilization.

Apart from the above designations, in FIG. 1 reference symbol 10 denotes the housing of a first plasma-stabilized packing burner with a combustion chamber 15, in which a plasma zone 11, a recirculation zone 12 and a combustion zone 13 are present. This set-up is also present in FIG. 3 and FIG. 5, the differences from FIG. 1 being dealt with in detail further below.

Figure 2:
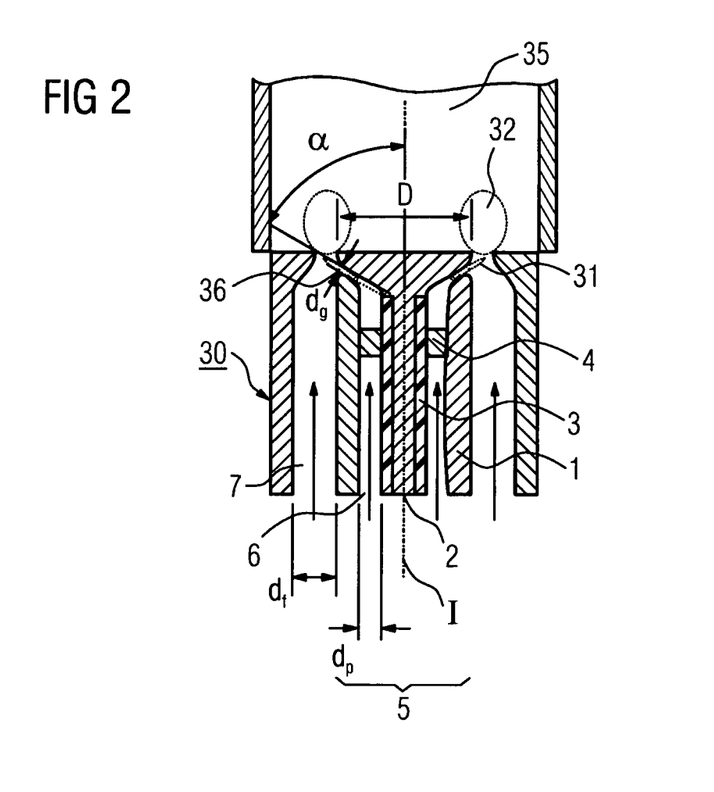
FIG. 2 shows an alternative set-up of the device according to FIG. 1.
Figure 3:
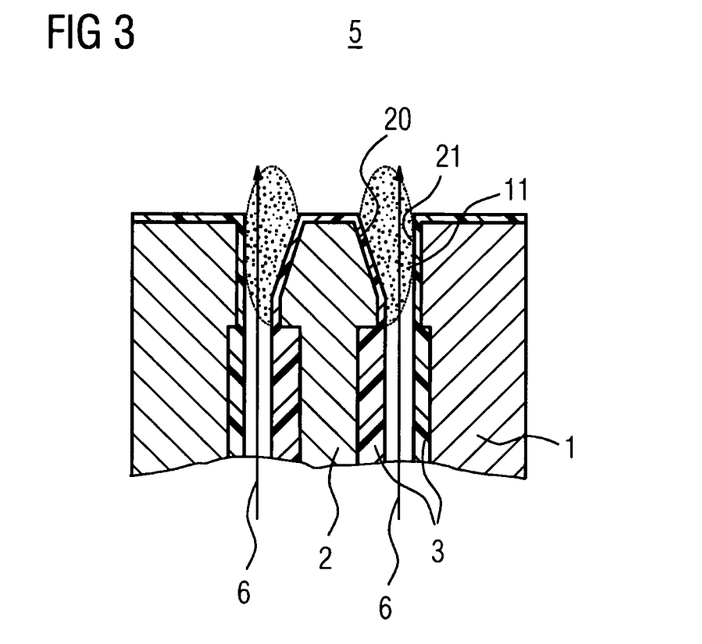
FIG. 3 shows a detail from a packing burner according to FIG. 1, in which a dielectrically impeded discharge device is additionally present.
Figure 4:
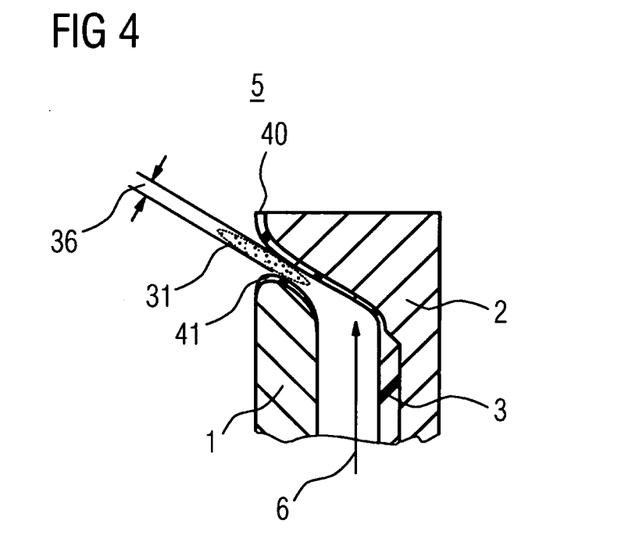
FIG. 4 shows a detail, corresponding to FIG. 3, from FIG. 2.

In contrast to FIGS. 1 and 3 which illustrate a plasma-stabilized burner, in FIG. 2 and FIG. 4 the housing wall is designated by 30 and a combustion chamber by 35, here a plasma zone 31 and a combustion zone 32 being obtained. Furthermore, inside the housing, a dielectric barrier 25 is additionally present.

Otherwise, the electrodes and ducts are designed correspondingly to the description already given generally above. The ducts 6 and 7, in particular of ring-shaped design, have a width of $d_f$ and $d_p$ respectively, the following generally being true:

$$d_f > d_p$$

Instead of the rotationally symmetrical set-up in the figures of the drawing, if appropriate, planar arrangements may also be formed. The principle is not thereby changed.

FIG. 1 thus implements, as a first example, a packing burner stabilized by a gliding arc plasma. Here, the blunt end of the plasma reactor ensures the efficient full mixing of the post-reaction zone of the plasma with the lean fuel-gas/air mixture and gives rise to a pronounced recirculation of the combustion gases in a similar way to a packing introduced into the flow or an introduced breakaway edge.

For the purpose of greater arc movement, the fuel-gas/steam supply of the plasma reactor 5 may accommodate a swirl generator which superposes a rotation in the azimuthal direction upon the translation of the arc in the axial direction. This is also dealt with further below with reference to FIG. 5.

Alternatively to the latter, it is also known that magnetic fields can be used for promoting the arc movement. If this effect is to be utilized, the magnetic field must be parallel to the swirl-free gas flow and consequently axial. Both measures may even be used simultaneously.

It must be remembered that the plasma is carried into the combustion space by the flowing fuel-gas/steam mixture and due to the shape of the electrodes, and therefore intimate contact of the reactive plasma exhaust gas with the fuel-gas/air mixture is achieved. In this case, the plasma always preferably burns in the fuel-gas/steam mixture, so that the formation of nitrogen-containing components, which may lead to nitrogen oxide emissions during subsequent combustion, is effectively prevented.

By contrast, FIG. 2 implements, as an alternative example to FIG. 1, such a burner 30 which is stabilized by a gliding arc plasma and in which the efficient full mixing of the post-reaction zone of the plasma with the lean fuel-gas/air mixture is achieved in that the exhaust gas from the plasma is introduced, directly before outlet into the combustion chamber 35, obliquely into the lean fuel-gas/air mixture. Important for this purpose is a gas discharge gap 36 with a width $d_g$ which stands at an angle $\alpha$ to the direction of the gas routing ducts 6, 7. At the outlet of the duct 7 into the combustion chamber 35, combustion zones 32 are then formed with the spacing D and form a ring in the case of a rotationally symmetrical design of the burner 30.

In FIG. 2, an azimuthal movement of the arc can be generated in the plasma reactor by a swirl generator and can just as well also be brought about by a magnetic field which runs approximately parallel to the swirl-free gas flow and therefore here also requires a radial component in addition to the axial component. Here, too, the plasma can be introduced into the fuel-gas/air duct by the gas flow and the shape of the electrodes. In this case, the plasma still preferably burns in the fuel-gas/steam mixture, so that the formation of nitrogen-containing components, which may lead to nitrogen oxide emissions during subsequent combustion, is effectively prevented.

FIG. 3 illustrates a detail of the operating range of the plasma-stabilized packing burner according to FIG. 1, although, in this case, the plasma has to be excited here by an alternating voltage on account of dielectric barriers 20, 21 between the electrodes 1, 2. Depending on their operating frequency, a somewhat low-power dielectrically impeded discharge or a capacitively coupled high-frequency discharge of increasable power is formed. The better controllability and the more homogeneous distribution of the plasma 11 are advantageous, as compared with the discharge according to FIG. 1, the more homogeneous distribution allowing a uniform treatment of the fuel-gas/steam mixture even without a swirl flow.

FIG. 4 illustrates a detail corresponding to that of FIG. 3 from the operating range of the plasma-stabilized burner according to FIG. 2, and in this case, as in FIG. 3, the plasma has to be excited again by an alternating voltage on account of dielectric barriers 40, 41 between the electrodes 1, 2. Depending on their operating frequency, a somewhat low-power dielectrically impeded discharge or a capacitively coupled high-frequency discharge of increasable power is formed.

In FIGS. 3 and 4, if appropriate, a ceramic coating of alternatively one of the two electrodes 1 or 2 is sufficient as a dielectric barrier.

Advantages of the arrangement according to FIG. 4, as compared with the arrangement according to FIG. 2, are the better controllability and more homogeneous distribution of the plasma which allows a uniform treatment of the fuel-gas/steam mixture even without a swirl flow.

Figure 5:
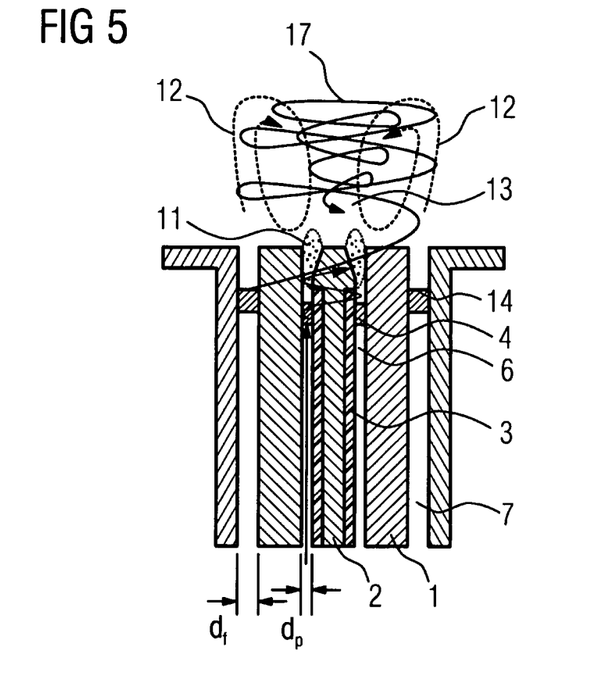
FIG. 5 shows a detail from a device according to FIG. 1 with two swirl generators.

FIG. 5 illustrates a device essentially corresponding to FIG. 1, in which a swirl generator 4 is present in the gas routing line 5 for the fuel-gas/steam mixture and a swirl generator 14 is present in the gas routing line for the lean fuel-gas/air mixture. In this case, the swirl generator 4 serves for increasing the radial velocity of the plasma/steam mixture, while the further swirl generator 14 in the line 6 for supplying the fuel gas can increase recirculation of the fuel gas and consequently the full mixing of the plasma exhaust gas and fuel gas in the combustion chamber 35. If appropriate, in this case, the swirl generator 14 in the fuel gas line 6 is even sufficient. It is important that, starting from the ring-shaped recirculation zone 12 according to FIG. 1, a swirl flow is generated with an additional recirculation zone having a central region which is indicated by the vortex line 17. The efficiency of combustion can consequently be improved further.

Figure 6:
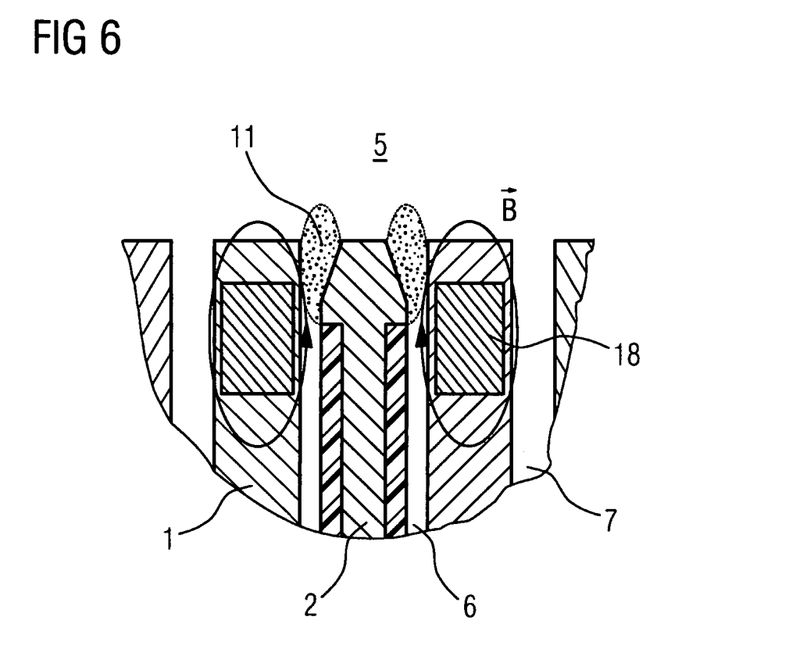
FIG. 6 shows a set-up alternative to FIG. 1 and having an electromagnet.

In FIG. 6, an electromagnet 18 is provided which generates a magnetic field B which, in the region of the gas discharge gap of the plasma reactor, runs parallel to the gas flow and perpendicularly to the gas discharge current. A Lorentz force is thereby generated on the gas discharge plasma, which is perpendicular to the gas flow and to the gas discharge current and therefore causes a rapid tangential movement of the plasma about the reactor axis I.

The electromagnet is preferably designed as part of the current supply of the gas discharge plasma. This ensures that, when the polarity of the gas discharge current is reversed, the magnetic field direction also changes, with the result that the force direction is maintained.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide v. DIRECTV, 69 USPQ2d 1865 (Fed. Cir. 2004).

The invention claimed is:

1. A method for combustion of a hydrocarbon-containing fuel-gas, in a burner, comprising:
   mixing the fuel-gas with steam in a supply line to the burner, to produce a fuel-gas/steam mixture;
   subjecting the fuel-gas/steam mixture to plasma treatment using an electrical gas discharge plasma, to produce a plasma-treated fuel-gas/steam mixture, the electrical gas discharge plasma being generated in a compact reactor which is in kinetically close contact with a combustion chamber of the burner;
   supplying the plasma-treated fuel-gas/steam mixture to the burner;
   mixing the plasma-treated fuel-gas/steam mixture in the burner with remaining operating gases; and
   burning the plasma-treated fuel-gas/steam mixture and the remaining operating gases in the combustion chamber of the burner.

2. The method as claimed in claim 1, further comprising adjusting a power density of the gas discharge plasma.

3. The method as claimed in claim 1, wherein plasma treatment triggers chemical reactions which generate stable and temporary products in the plasma treated fuel/steam mixture.

4. The method as claimed in claim 3, wherein
   the remaining operating gases comprise fuel gas or a mixture of fuel gas and an oxidant,
   the fuel-gas/steam mixture is a lean fuel-gas/steam mixture, and
   the stable and the temporary products improve fuel conversion of the lean fuel-gas/air mixture.

5. The method as claimed in claim 1, further comprising varying a hydrocarbon fuel source for the fuel-gas.

6. The method as claimed in claim 1, wherein mixing the fuel-gas with steam is controlled by regulating a mass flow rate of steam with respect to a mass flow rate and carbon content of the fuel-gas.

7. The method as claimed in claim 6, wherein the mass flow rate of steam is regulated based on a specific energy supplied to the fuel-gas/steam mixture by the plasma.

8. The method as claimed in claim 7, wherein
   a lower limit value for the mass flow rate of steam is set to avoid soot formation, and
   an upper limit value for the mass flow rate of steam is set to limit an interaction of the plasma with steam and ensure efficient conversion of the fuel-gas.

9. The method as claimed in claim 1, wherein
   an electrical power supplied to the plasma is regulated as a function of mass flow rates such that chemically active radicals and ions are generated in sufficient numbers to initiate reforming reactions, and such that gas heating takes place which ensures that chain reactions initiated by the chemically active radicals and ions will accelerate.

10. The method as claimed in claim 9, wherein
    an upper limit for an electrical power density and a lower limit for an inflow velocity of the steam/fuel-gas mixture are set to avoid formation of a thermal plasma.

11. The method as claimed in claim 1, wherein kinetically close contact between the compact reactor and the combustion chamber is achieved in flow terms by preventing a thermodynamic equilibrium in the plasma treated fuel-gas/steam mixture and by full mixing of the plasma treated fuel-gas/steam mixture with the remaining operating gases.

12. The method as claimed in claim 11, wherein a combustion induction zone is shortened, as compared with a thermodynamically stable final state of steam reforming.

13. The method as claimed in claim 11, wherein
    the electrical gas discharge plasma is generated using electrodes which cause electrode-guided gas discharges, and
    the electrical gas discharges have no contact with the electrodes.

14. The method as claimed in claim 11, wherein the electrical gas discharge plasma is excited using frequencies greater than or equal to 6.5 MHz.

15. The method as claimed in claim 14, wherein infeed takes place either capacitively or inductively by generating electromagnetic waves using antenna structures.

16. The method as claimed in claim 1, wherein the electrical gas discharge plasma is generated by electrode-guided gas discharges.

17. The method as claimed in claim 16, wherein a plasma impedance is used to regulate an operating voltage and avoid a transition to a thermal arc.

18. The method as claimed in claim 1, wherein plasma treatment takes place at an end of a gas supply upon outlet into the combustion chamber.

19. The method as claimed in claim 1, wherein plasma treatment takes place in a gas supply before outlet into the combustion chamber.

20. A device for combustion of a hydrocarbon-containing fuel-gas, comprising:
    a burner with primary gas supply lines for a fuel-gas/air mixture;
    a combustion chamber to combust the fuel-gas/air mixture; and
    a plasma reactor integrated into the burner to generate a reactive plasma gas, the plasma reactor comprising:
      an auxiliary supply to supply a fuel-gas/steam mixture; and
      an electrical power supply,
    wherein the device has a flow routing for the fuel-gas/air mixture, the fuel-gas/steam mixture and the reactive plasma gas such that the plasma reactor is in kinetically close contact with the combustion chamber.

21. The device as claimed in claim 20, wherein the flow routing causes a full mixing of the reactive plasma gas with the fuel-gas/air mixture in the combustion chamber.

22. The device as claimed in claim 20, wherein the flow routing comprises a vortex generator in the flow routing.

23. The device as claimed in claim 20, wherein the flow routing comprises at least one swirl generator for gas flows.

24. The device as claimed in claim 20, wherein the flow routing comprises at least one magnet.

25. The device as claimed in claim 20, wherein the plasma reactor is positioned such that full mixing of the reactive plasma gas with the fuel-gas/air mixture in the combustion chamber starts in an immediate vicinity of a gas inlet for the fuel-gas/air mixture into the combustion chamber.

26. The device as claimed in claim 25, wherein the plasma reactor has an extended discharge gap integrated into the burner, the discharge gap issuing into the combustion chamber, near an inlet of the fuel-gas/air mixture and at a stipulated angle with the primary gas supply lines for the fuel-gas/air mixture to ensure an efficient full mixing of the reactive plasma gas with the fuel-gas/air mixture.

27. The device as claimed in claim 20, wherein the flow routing causes a non-thermal plasma to move quickly in relation to a flow of the fuel-gas/air mixture.

28. The device as claimed in claim 27, wherein a first swirl generator is positioned in the auxiliary supply to superpose a rotation in an azimuthal direction at a location where an electrical gas discharge plasma generated the reactive plasma gas is generated.

29. The device as claimed in claim 27, wherein
the reactive plasma gas is generated by a gas discharge current, and
an electromagnet generates a magnetic field which runs parallel to a swirl-free gas flow and perpendicularly to the gas discharge current.

30. The device as claimed in claim 27, further comprising a device to generate dielectrically impeded discharges.

31. The device as claimed in claim 30, wherein
the plasma reactor further comprises electrodes to generate the reactive plasma gas, and
the device to generate dielectrically impeded discharges comprises dielectric barriers which are excited by an alternating voltage, arranged between the electrodes.

32. The device as claimed in claim 31, wherein the dielectric barrier is formed of a material having a thickness which is minimized without sacrificing a dielectric strength of the material.

33. The device as claimed in claim 20, wherein the plasma reactor further comprises a magnetic field generator to generate a magnetic field in the reactive plasma gas.

* * * * *